(12) United States Patent
Lin

(10) Patent No.: US 7,931,019 B2
(45) Date of Patent: Apr. 26, 2011

(54) SELF-POWERED PUMP FOR HEATED LIQUID, FLUID HEATING AND STORAGE TANK AND FLUID HEATING SYSTEM EMPLOYING SAME

(76) Inventor: Huazi Lin, Richmond Hill (CA)

( * ) Notice: Subject to any disclaimer, the term of this patent is extended or adjusted under 35 U.S.C. 154(b) by 0 days.

(21) Appl. No.: 12/424,755

(22) Filed: Apr. 16, 2009

(65) Prior Publication Data

US 2009/0277444 A1    Nov. 12, 2009

(30) Foreign Application Priority Data

May 9, 2008    (CA) ..................................... 2628605

(51) Int. Cl.
*F24J 2/30* (2006.01)
(52) U.S. Cl. ........ 126/643; 126/569; 126/634; 165/120; 165/164; 417/52; 417/152; 417/207; 137/87.02; 137/124; 137/134
(58) Field of Classification Search .................. 126/643, 126/569, 634; 165/120, 164; 417/52, 152, 417/207, 208, 306; 137/87.02, 123, 134, 137/136, 143, 144, 152
See application file for complete search history.

(56) References Cited

U.S. PATENT DOCUMENTS

| | | | | |
|---|---|---|---|---|
| 3,937,599 A | * | 2/1976 | Thureau et al. ................ | 417/389 |
| 4,237,862 A | * | 12/1980 | Embree ........................... | 126/588 |
| 4,357,932 A | * | 11/1982 | Stacy ............................. | 126/636 |
| 4,458,669 A | * | 7/1984 | Lee ................................. | 126/618 |
| 4,531,510 A | * | 7/1985 | Barthez et al. ................. | 126/591 |
| 4,542,762 A | * | 9/1985 | Littlehale ....................... | 137/78.3 |
| 4,691,692 A | * | 9/1987 | Conner et al. ................. | 126/584 |
| 7,574,870 B2 | * | 8/2009 | Filippone ........................ | 62/119 |

OTHER PUBLICATIONS

Chris Fitz-Hardy, Canadian Intellectual Property Office Action, Dec. 18, 2009, 3 pages, Canadian Intellectual Property Office, Canada.

* cited by examiner

*Primary Examiner* — Steven B McAllister
*Assistant Examiner* — Avinash Savani
(74) *Attorney, Agent, or Firm* — WPAT, PC; Justin King

(57) ABSTRACT

A self-powered pump for heated liquid is provided. The pump includes an airtight container for containing the heated liquid. A heated liquid inlet pipe extends upwardly into the container such that its end is within the container. A heated liquid outlet is lower than the end of the inlet pipe. A breathing pipe extends upwardly into the container such that its end is within the container and is higher than both of the outlet and the end of the inlet pipe but lower than an interior side of the container top. An opposite end of the breathing pipe is outside the container, lower than the container base, and is received by an open container such that the opposite end can become submerged in heated liquid accumulated within the open container during pump operation. A fluid or liquid heating system incorporating the self-powered pump may operate without external power for the pump.

15 Claims, 8 Drawing Sheets

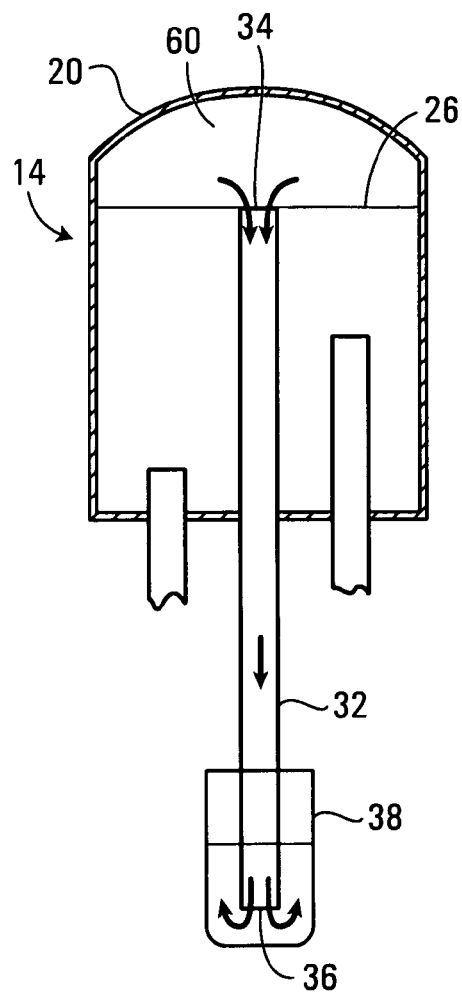
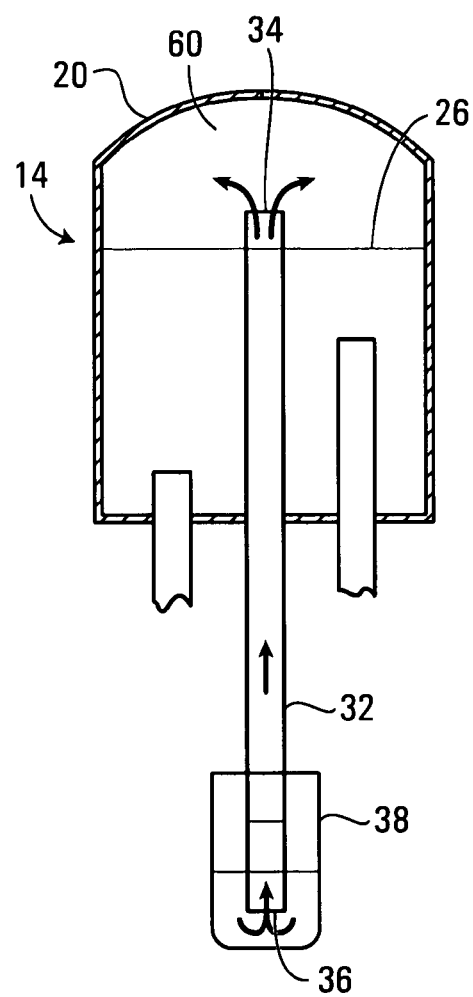
FIG. 2  FIG. 3

SELF-POWERED PUMP FOR HEATED LIQUID, FLUID HEATING AND STORAGE TANK AND FLUID HEATING SYSTEM EMPLOYING SAME

FIELD OF TECHNOLOGY

The present disclosure relates to self-powered pumps for heated liquids. The present disclosure also relates to fluid storage tanks having heat exchangers that may be used to heat fluid stored within the tanks. The present disclosure further relates to fluid heating systems employing either or both of such components.

BACKGROUND

A solar water heater system is a type of fluid heating system that typically has two primary components. The first component is a solar panel, possibly comprising a plurality of evacuated tubes and a heat-insulated reservoir for temporarily storing heated fluid to be transferred, for heating water using solar energy. The second component is a storage tank for storing the heated water. It is common to situate the storage tank above the panel so that the heated water, which tends to rise, naturally accumulates within the storage tank without the use of a pump. However, this arrangement may be disadvantageous in various respects. Firstly, because the storage tank can be heavy, situating the tank above the panel may cause the system to be top-heavy and therefore unstable, e.g. in high winds. Secondly, the tank may be considered unsightly.

In view of these disadvantages, some solar water heating systems have been developed wherein the storage tank is situated lower than the solar panel. This is typically achieved through the use of an electrical pump that circulates the water through hoses or pipes between the panel and the storage tank. Such systems are disadvantageous in that the pump consumes external power (i.e. electricity) and requires a control system, which may increase equipment, installation and operating costs.

Some solar water heater systems employ two types of liquid—a primary liquid and a secondary liquid—which are kept in isolation from one another. The primary liquid is the water that is heated within the system, e.g. for human consumption. The secondary liquid is another liquid which is heated within the solar panel and whose heat is conveyed to the primary liquid by way of a heat exchanger. The secondary liquid typically has a freezing point that is lower than that of water. This is in order to limit the risk of freezing damage to the panel in colder climates. The secondary liquid may for example by ethylene glycol or an ethanol solution as used in conventional automotive windshield washer fluid. The heat exchanger is used to convey heat from the secondary liquid to the primary liquid without fluid communication between them. The heat exchanger is contained within the primary liquid storage tank. In such tanks, any vibration of the heat exchanger during its use may jeopardize the structural integrity of the tank, risking a leak. Moreover, known liquid storage tanks of this type are typically intended for installation in a predetermined orientation, which may be unsuitable for certain consumers.

A pump for heated liquid that operates without the use of external power would be desirable. As well, a fluid heating and storage tank that is capable of better withstanding vibration and that may be capable of installation in more than one orientation would be desirable. Finally, a fluid heating system employing either or both of such components would be desirable.

SUMMARY

In accordance with one aspect of the present disclosure there is provided a self-powered pump for heated liquid, comprising: an airtight container for containing the heated liquid, said airtight container having a base and a top; a heated liquid inlet pipe extending upwardly into said airtight container such that an end of said inlet pipe is within the airtight container; a heated liquid outlet from said airtight container that is lower than said end of said inlet pipe; a breathing pipe extending upwardly into said airtight container such that an end of said breathing pipe is within the airtight container and is higher than both of said outlet and said end of said inlet pipe but lower than an interior side of said top of said airtight container, an opposite end of said breathing pipe being outside said airtight container and lower than said base; and an open container for receiving said opposite end of said breathing pipe such that said opposite end can become submerged in heated liquid accumulated within said open container during pump operation.

In accordance with another aspect of the present disclosure there is provided a fluid heating system comprising: a fluid heating and storage tank comprising: a storage tank for a primary fluid, said storage tank having a primary fluid inlet, a primary fluid outlet, a secondary fluid inlet and a secondary fluid outlet; and apparatus disposed within said storage tank for flowing a secondary fluid which is a liquid through said storage tank in isolation from said primary fluid, said apparatus fluidly interconnecting said secondary fluid inlet with said secondary fluid outlet and comprising a heat exchanger; a heater for the secondary fluid, said heater having an inlet and an outlet for secondary fluid, said outlet being higher than said fluid heating and storage tank; a return conduit for flowing secondary fluid from said secondary fluid outlet of said fluid heating and storage tank to said heater inlet; a self-powered pump for the secondary fluid which is a liquid, said pump being above a level of said heater outlet, said pump comprising: an airtight container for containing the secondary fluid, said airtight container having a base and a top; a secondary fluid inlet pipe extending upwardly into said airtight container such that an end of said inlet pipe is within the airtight container; a secondary fluid outlet from said airtight container that is lower than said end of said inlet pipe; a breathing pipe extending upwardly into said airtight container such that an end of said breathing pipe is within the airtight container and is higher than both of said outlet of said self-powered pump and said end of said inlet pipe but lower than said top of said airtight container, an opposite end of said breathing pipe being outside said airtight container and lower than said base; and an open container for receiving said opposite end of said breathing pipe such that said opposite end can become submerged in heated secondary fluid accumulated within said open container during pump operation; a conduit for flowing secondary fluid upwardly from said heater outlet to said secondary fluid inlet pipe of said self-powered pump; and a conduit for flowing secondary fluid from said self-powered pump outlet to said secondary fluid inlet of said fluid heating and storage tank.

In accordance with yet another aspect of the present disclosure there is provided a liquid heating system comprising: a heater for heating said liquid, said heater having an inlet for the liquid and an outlet for the liquid; and a self-powered pump for pumping the heated liquid, said pump being above a level of said heater outlet, said pump comprising: an airtight container for containing the heated liquid, said airtight container having a base and a top; a heated liquid inlet pipe extending upwardly into said airtight container such that an end of said inlet pipe is within the airtight container; a heated liquid outlet from said airtight container that is lower than said end of said inlet pipe; a breathing pipe extending upwardly into said airtight container such that an end of said breathing pipe is within the airtight container and is higher than both of said outlet of said self-powered pump and said end of said inlet pipe but lower than said top of said airtight container, an opposite end of said breathing pipe being outside said airtight container and lower than said base; and an open container for receiving said opposite end of said breathing pipe such that said opposite end can become submerged in heated liquid accumulated within said open container during pump operation; and a conduit for flowing heated liquid upwardly from said heater outlet to said heated liquid inlet pipe of said self-powered pump.

In accordance with yet another aspect of the present disclosure there is provided a fluid heating and storage tank, comprising: a storage tank for a primary fluid, the storage tank having a primary fluid inlet and a primary fluid outlet; and apparatus for flowing a secondary fluid through the storage tank in isolation from the primary fluid, the apparatus comprising: a first pipe extending through the storage tank and mounted at one end to a first fitting in the wall of the storage tank and at another end to a second fitting in the wall of the storage tank; a second pipe extending through the storage tank and mounted at one end to a third fitting in the wall of the storage tank and at another end to a fourth fitting in the wall of the storage tank; and a heat exchanger disposed within the storage tank and fluidly interconnecting the first pipe and the second pipe.

In accordance with yet another aspect of the present disclosure there is provided a fluid heating system comprising: a fluid heating and storage tank comprising: a storage tank for a primary fluid, the storage tank having a primary fluid inlet and a primary fluid outlet; and apparatus for flowing a secondary fluid which is a liquid through the storage tank in isolation from the primary fluid, the apparatus comprising: a first pipe extending through the storage tank and mounted at one end to a first fitting in the wall of the storage tank and at another end to a second fitting in the wall of the storage tank; a second pipe extending through the storage tank and mounted at one end to a third fitting in the wall of the storage tank and at another end to a fourth fitting in the wall of the storage tank; and a heat exchanger disposed within the storage tank and fluidly interconnecting the first pipe and the second pipe, wherein at least one of the first and second fittings serve as a secondary fluid inlet and at least one of the third and fourth fittings serve as a secondary fluid outlet; a heater for the secondary fluid, the heater having a inlet for secondary fluid and an outlet for secondary fluid; and a pump for circulating the secondary fluid from the heater outlet to the secondary fluid inlet of the fluid heating and storage tank and from the secondary fluid outlet of the fluid heating and storage tank to the heater inlet.

In accordance with yet another aspect of the present disclosure there is provided a fluid heating system comprising: a fluid heating and storage tank comprising: a storage tank for a primary fluid, the storage tank having a primary fluid inlet and a primary fluid outlet; and apparatus for flowing a secondary fluid which is a liquid through the storage tank in isolation from the primary fluid, the apparatus comprising: a first pipe extending through the storage tank and mounted at one end to a first fitting in the wall of the storage tank and at another end to a second fitting in the wall of the storage tank; a second pipe extending through the storage tank and mounted at one end to a third fitting in the wall of the storage tank and at another end to a fourth fitting in the wall of the storage tank; and a heat exchanger disposed within the storage tank and fluidly interconnecting the first pipe and the second pipe, wherein at least one of the first and second fittings serve as a secondary fluid inlet and at least one of the third and fourth fittings serve as a secondary fluid outlet; a heater for the secondary fluid the heater having an inlet and an outlet, the outlet being higher than the fluid heating and storage tank; a return conduit for flowing secondary fluid from the secondary fluid outlet of the fluid heating and storage tank to the heater inlet; a self-powered pump for the secondary fluid, the pump being above a level of the heater outlet, the pump comprising: an airtight container for containing the secondary fluid, the airtight container having a base and a top; a secondary fluid inlet pipe extending upwardly into the airtight container such that an end of the inlet pipe is within the airtight container; a secondary fluid outlet from the airtight container that is lower than the end of the inlet pipe; a breathing pipe extending upwardly into the airtight container such that an end of the breathing pipe is within the airtight container and is higher than both of the outlet of the self-powered pump and the end of the inlet pipe but lower than an interior side of the top of the airtight container, an opposite end of the breathing pipe being outside the airtight container and lower than the base; and an open container for receiving the opposite end of the breathing pipe such that the opposite end is capable of becoming submerged in heated secondary fluid accumulated within the open container during pump operation; a conduit for flowing secondary fluid upwardly from the heater outlet to the secondary fluid pipe of the self-powered pump; and a conduit for flowing secondary fluid from the self-powered pump outlet to the secondary fluid inlet of the fluid heating and storage tank.

In accordance with yet another aspect of the present disclosure there is provided a fluid heating system comprising: a fluid heating and storage tank comprising: a storage tank for a primary fluid, the storage tank having a primary fluid inlet and a primary fluid outlet; and apparatus for flowing a secondary fluid through the storage tank in isolation from the primary fluid, the apparatus comprising: a first pipe extending through the storage tank and mounted at one end to a first fitting in the wall of the storage tank and at another end to a second fitting in the wall of the storage tank; a second pipe extending through the storage tank and mounted at one end to a third fitting in the wall of the storage tank and at another end to a fourth fitting in the wall of the storage tank; and a heat exchanger disposed within the storage tank and fluidly interconnecting the first pipe and the second pipe, wherein at least one of the first and second fittings serve as a secondary fluid inlet and at least one of the third and fourth fittings serve as a secondary fluid outlet; a heater for the secondary fluid, the heater having a secondary fluid inlet and a secondary fluid outlet, the secondary fluid inlet of the heater being lower than the secondary fluid outlet of the fluid heating and storage tank, the secondary fluid outlet of the heater being lower than the secondary fluid inlet of the fluid heating and storage tank; a conduit for flowing secondary fluid from the secondary fluid outlet of the heater to the secondary fluid inlet of the fluid heating and storage tank; and a conduit for flowing secondary fluid from the secondary fluid outlet of the fluid heating and storage tank to the secondary fluid inlet of the heater.

Other aspects and features of the present disclosure will become apparent to those ordinarily skilled in the art upon review of the following description of specific embodiments of the invention in conjunction with the accompanying figures.

BRIEF DESCRIPTION OF THE DRAWINGS

In the figures which illustrate exemplary embodiments of this invention:

FIG. 2 is schematic diagram illustrating the pump of FIG. 1 upon the expansion of heated liquid;

FIG. 3 is schematic diagram illustrating the pumping apparatus of FIG. 1 upon the contraction of heated liquid;

DETAILED DESCRIPTION

Figure 1:
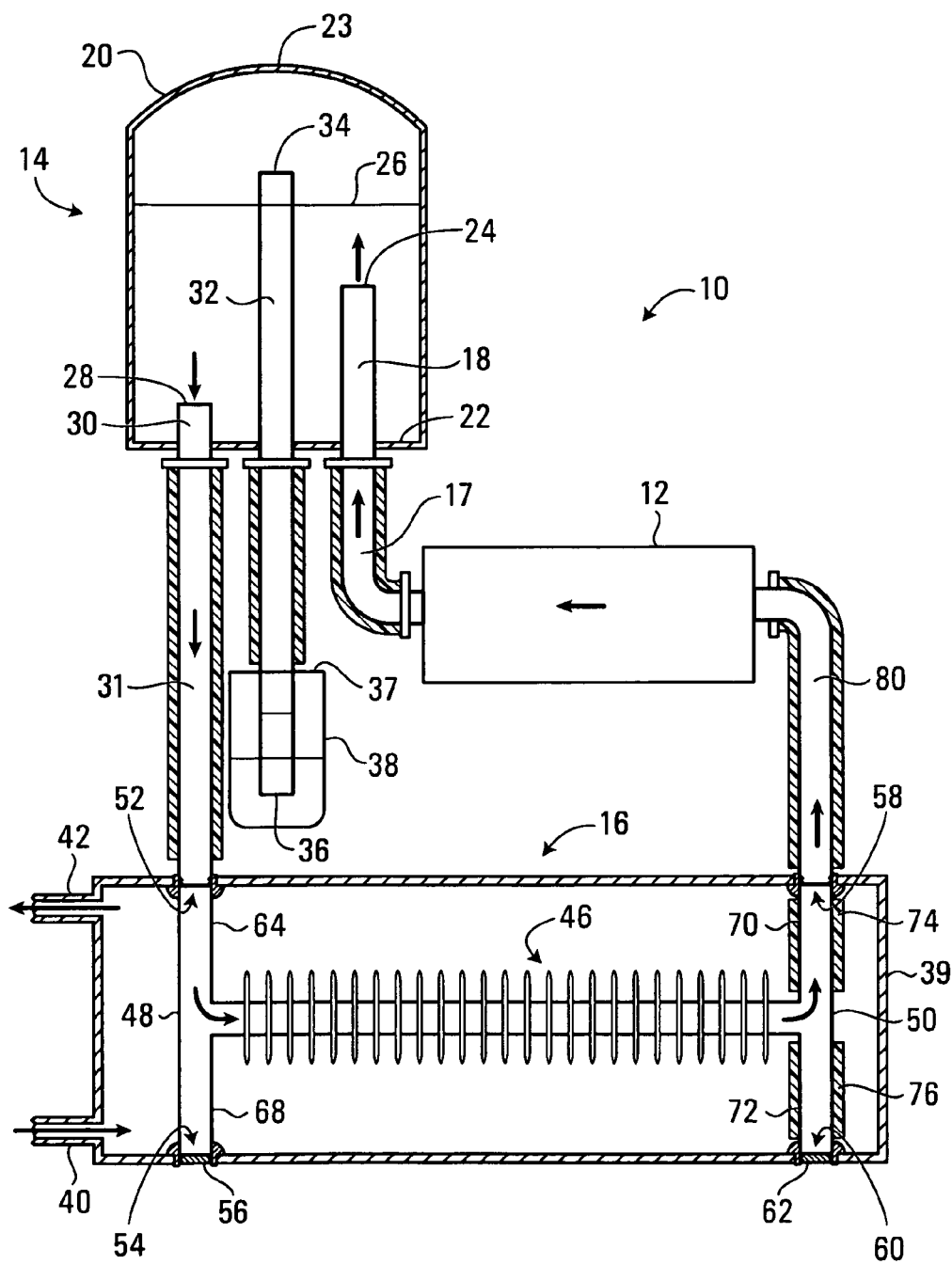
FIG. 1 is schematic side view of an exemplary fluid heating system employing a self-powered pump for heated liquid and a fluid heating and storage tank.

Referring to FIG. 1, an exemplary liquid heating system 10 suitable for heating a primary liquid (e.g. water for human consumption) is illustrated in schematic side view during use. The system 10 includes a heater 12 for heating a secondary liquid, a self-powered pump 14 for pumping the heated secondary liquid (referred to simply as "pump 14" for convenience), and a fluid heating and storage tank 16 with contained heat exchanger 46 (referred to as "fluid heating/storage tank 16"). The heater 12, pump 14 and heat exchanger 46 within the fluid heating/storage tank 16 are interconnected so as to form a "loop" within system 10, i.e. a closed circuit through which the secondary liquid can circulate. The relative sizes of heater 12, pump 14 and fluid heating/storage tank 16 in FIG. 1 are not to scale. For example, the pump 14 may be much smaller than the heater 12 and the fluid heating/storage tank 16.

Heater 12 may be any apparatus that is suitable for heating liquid, such as a solar panel or gas heater for example. It contains a reservoir (not expressly shown) for holding the secondary liquid to be heated. The secondary liquid may be a liquid with a freezing point that is lower than water, such as ethylene glycol or an ethanol solution for example. This may be the case if heater 12 is a solar panel, so as to reduce the likelihood of freezing damage to the panel (which may comprise a plurality of glass evacuated tubes) in cold climates. The secondary liquid heated by heater 12 tends to rise and therefore flows upwardly towards pump 14 through conduit 17 and into inlet pipe 18.

Pump 14 is an apparatus that serves to pump the heated secondary liquid towards the heat exchanger 46 within fluid heating/storage tank 16, which is lower than the outlet of heater 12. The pump 14 is self-powered, i.e. it does not require external power in order to pump heated liquid. Pump 14 comprises an airtight container 20 made from a rigid material that is suitable for containing the heated secondary liquid, such as glass or steel for example. The airtight container may be heat-insulated (e.g. vacuum heat-insulated). The container has a base 22, which is substantially flat in the illustrated embodiment (but is not necessarily flat in alternative embodiments), and a top 23. The inlet pipe 18 extends upwardly through base 22 into the airtight container 20, such that an end 24 of the inlet pipe is within the container 20. A heated liquid outlet 28 from container 20, which outlet takes the form of an outlet pipe 30 in the illustrated embodiment, is lower than the end 24 of the inlet pipe 18. A conduit 31 connects the other end of the outlet pipe 30 to an inlet of the fluid heating/storage tank 16.

A breathing pipe 32 extends upwardly through base 22 of container 20 such that its end 34 is within the container and is higher than both of outlet 28 and the end 24 of inlet pipe 18. The end 34 is also spaced from the interior side of top 23 of the container 20 so as to maintain a volume of gas 60 (e.g. air and secondary liquid in a gaseous or vapour state) above the liquid within the container 20 during use of the pump 14. An opposite end 36 of the breathing pipe 32 is outside the container 20, lower than base 22. The end 36 is received within open (i.e. open to the atmosphere) container 38, which may contain varying levels of the secondary liquid during operation. The end 36 is lower than a brim 37 of the container 38 so that the end 36 may become submerged during operation of pump 14. This serves to limit evaporation of the heated secondary liquid from the system 10. The system 10 can however operate for some time (e.g. upon start-up) even when the end 36 is not submerged in liquid. Container 38 may be insulated.

The base 22 of airtight container 20 may be circular. In this case, the points at which the inlet pipe 18, outlet pipe 30 and breathing pipe 32 pass through the base 22 may be arranged like the vertices of a notional equilateral triangle superimposed upon base 22.

Fluid heating/storage tank 16 is for storing a primary liquid (in this case, water) to be heated by the secondary liquid via a heat exchanger. Fluid heating/storage tank 16 includes a storage tank 39 for a primary liquid. The tank 39 has an inlet 40 for primary liquid to be heated and an outlet 42 for the primary liquid once it has been heated. The storage tank 39 also contains an apparatus for flowing the secondary liquid through the tank. The apparatus includes a first pipe 48 and a second pipe 50 extending through the storage tank 39. One end of the first pipe 48 is mounted to a first fitting 52 in the wall of the tank 39, and the other end of the first pipe 48 is mounted to a second fitting 54 in the wall of the tank 39. Similarly, one end of the second pipe 50 is mounted to a third fitting 58 in the wall of the tank 39, and the other end of the second pipe 50 is mounted to a fourth fitting 60 in the wall. The pipes 48 and 50 are substantially parallel in the present embodiment, although this is not required. In the illustrated embodiment, the first and third fittings 52 and 58 are in one wall of the tank 39 while second and fourth fittings 54 and 60 are located in an opposing wall. This is not necessarily required of all embodiments. The heat exchanger 46 is disposed within the tank 39 and fluidly interconnects the pipes 48 and 50. The purpose of heat exchanger 46 is to convey heat from the secondary liquid that flows therethrough to the primary liquid within tank 39. The heat exchanger 46 is illustrated as a plurality of radiating fins in FIG. 1, but could take other forms in alternative embodiments (e.g. a coil).

In combination, the pipes 48 and 50 and heat exchanger 46 of the embodiment illustrated in FIG. 1 have an H-like shape (or N-like shape, as described later). This is not necessarily true of all embodiments. For example, if the pipes 48, 50 are not substantially parallel or if the heat exchanger 46 is not substantially straight, the shape of this structure may not be an H-like or N-like shape. The portions of pipe 48 that are above and below the heat exchanger 46 in FIG. 1 are referred to as leg 64 and leg 68, respectively, of the pipe 48. The portions of pipe 50 that are above and below the heat exchanger 46 in FIG. 1 are referred to as leg 70 and leg 72, respectively, of pipe 50. The length of legs 64 and 68 need not be the same, nor does the length of legs 70 and 72 need to be the same. That is, the heat exchanger 46 need not be centrally disposed within the tank 39. For example, the heat exchanger 46 may be disposed closer to a bottom of the tank 39 than to its top (in the intended installation orientation of the tank 39).

The pipes 48 and 50 impart structural stability to the heat exchanger 46 by virtue of being mounted, transversely in the case of the elongate fluid heating/storage tank 16 illustrated in FIG. 1, to the walls of the tank 39. This limits any vibration of the heat exchanger 46 that might occur during use and thereby reduces the risk of structural damage (such as cracks resulting in leaks) to the fluid heating/storage tank 16.

The pipes 48, 50 and heat exchanger 46 the secondary liquid to flow through the storage tank 39 in isolation from the primary liquid within the tank. This isolation avoids contamination of the primary liquid with the secondary liquid (and vice-versa). It also permits the tank 39 to be subjected to municipal water pressure, if desired, without risk of damage to heater 12 or pump 14.

All of the fittings 52, 54, 58 and 60 may for example be copper or stainless steel fittings. The fittings are threaded in the present embodiment so as to simplify watertight interconnection of a threaded end of a conduit (e.g. conduit 31 into fitting 52) or watertight capping of the fitting with a threaded cap (e.g. cap 56 within fitting 54) from the exterior of tank 39. The decision as to which fittings of tank 39 should be capped during use and which fittings should be connected to conduits for a flowing secondary liquid may be made by a consumer, based on a desired orientation of the fluid heating/storage tank 16 at the consumer premises for example. Typically, one of the first and second fittings 52 and 54 will be capped, and one of the third and fourth fittings 58 and 60 will be capped. The uncapped fitting 52 or 54 is then connected to conduit 31 from the pump 14, and the uncapped fitting 58 or 60 is connected to return conduit 80. This promotes secondary liquid flow through the heat exchanger 46. For example, in FIG. 1, fittings 54 and 60 are capped with caps 56 and 62, respectively. It is less likely, although possible, that both fittings 52 and 54 would be uncapped and would be interconnected so that both fittings receive secondary liquid from conduit 31 (e.g. via a T or Y connector) and/or that both fittings 58 and 60 would be uncapped and connected to return conduit 80 (e.g. also via a T or Y connector). In some embodiments, the capped fittings may be permanently capped (e.g. by welding at the factory) rather removably capped, for reduced susceptibility to leaks.

Insulation 74 surrounds the leg 70 through which the secondary liquid exits tank 39 in the illustrated embodiment. This insulation 74 prevents the exiting secondary liquid, which is cooler than it was upon its entry through fitting 52, from robbing the surrounding primary liquid within tank 16 of heat as it exits the tank. Leg 72 is similarly surrounded by insulation 76. The reason is that, in some orientations of the fluid heating/storage tank 16, the secondary liquid may exit the H-shaped structure through fitting 62 rather than fitting 58.

The tank 39 may be entirely filled with primary liquid during use (e.g. if the tank is subjected to municipal water pressure) or only partly filled with primary liquid (if the tank 39 is open to the atmosphere and thus not subjected to municipal water pressure).

A return conduit 80 flows secondary liquid exiting fluid heating/storage tank 16 via fitting 58 back to heater 12, thus completing the loop. All of the conduits/pipes 17, 31, 32 and 80 are insulated to limit heat loss to the environment. The pump 14 and fluid heating/storage tank 16 are also insulated, although this is not expressly shown in FIG. 1.

During operation, secondary liquid is heated by heater 12. The heated secondary liquid expands and rises up insulated conduit 17 into inlet tube 18 within container 20. The level 26 of the secondary liquid within container 20 may be higher or lower than end 24 of inlet pipe 18 during operation. The liquid level 26 will vary in relation to many factors, including the current temperature of the secondary liquid within system 10, which may change over time. This may be due to variable heating by heater 12 over time. For example, if heater 12 is a solar panel, the degree of heating may be high when it is sunny and low when it is cloudy.

FIG. 2 illustrates the secondary liquid level 26 within container 20 when the secondary liquid within system 10 has become very hot. The increased secondary liquid level 26 as compared to FIG. 1 is due to expansion of the secondary liquid within system 10. As the secondary liquid level 26 rises due to expansion, the volume of the gas 60 above the heated secondary liquid within tank 20 (which may be air or other gas mixed with gaseous secondary fluid) decreases. As a result, the gas pressure increases, since the container 20 is airtight. This increased pressure tends to force some of the gas downwardly through breathing pipe 32. If the gas pressure is sufficient, the downwardly forced gas may escape from the lower end 36 of pipe 32 and may bubble up through the secondary liquid within open container 38. Although the secondary liquid level 26 within the container 20 may on some occasions temporarily exceed the height of end 34 of breathing pipe 32, this will be temporary, because the secondary liquid will pour down pipe 32 into open container 38 until the liquid level 26 in container 20 drops to the height of end 34.

FIG. 3 illustrates the level 26 of secondary liquid within container 20 when the secondary liquid within system 10 cools. The decreased level 26 is due to the contraction of the secondary liquid within the system 10. As the secondary liquid level 26 drops, the volume of the gas 60 within tank 20 above the secondary liquid increases. As a result, the gas pressure within container 20 decreases. This tends to draw gas from within the breathing pipe 32 back into the container 20. It may also cause secondary liquid from open container 38 to be drawn up into the lower end 36 of breathing pipe 32 (as shown in FIG. 3). It is unlikely, and possibly undesirable, for secondary liquid to be drawn from within open container 38 fully back up pipe 32 into container 20, as this might disadvantageously cool the secondary liquid within the container 20. Other factors which may cause gas and/or secondary liquid to be drawn up breathing pipe 32 may include the egress of some cooling secondary liquid down inlet pipe 18. The factors at play may change over time depending upon the changing relative temperature of the secondary fluid at various points within the system 10.

The periodic egress and ingress of gas and liquid through the pipe 32 during heating and cooling of the liquid in the system 10 is the reason that the pipe 32 is referred to as a "breathing pipe".

Upon exiting pump 14, the heated secondary liquid flows down through insulated conduit 31 and through fitting 52 (which serves as a secondary liquid inlet in this case). The flow of secondary liquid through the "H shaped" structure formed by pipes 48, 50 and heat exchanger 46 is than as follows: the heated secondary liquid enters leg 64 through fitting 52, flows through heat exchanger 46 into leg 70, and exits leg 70 (and the H-shaped structure as a whole) via fitting 58. It will be appreciated that the flow of secondary liquid within legs 68 and 72 may be limited or nonexistent in this arrangement. The heated secondary liquid within leg 64 and heat exchanger 46 gives off its heat to the primary fluid within the tank 39. The exiting, cooler secondary liquid returns to heater 12 via insulated return conduit 80. In heater 12, the secondary liquid is reheated, commencing the cycle anew.

Advantageously, the pump 14 circulates heated secondary liquid throughout the loop within system 10 without the use of external power, even though the fluid heating/storage tank 16 is lower than the outlet of heater 12. In the case where heater 12 is a solar panel, this may permit the solar panel to be mounted to the exterior of a building (e.g. on the roof) while the fluid heating/storage tank 16 is housed below it within the building (e.g. within an attic). This avoids the problem of unsightly, top-heavy water storage tanks and avoids needless consumption of electricity. Moreover, because the tank is housed indoors, heat loss to the environment (e.g. as may occur when the outside temperature is cold) may be reduced. As well, such an arrangement may address the problem of freezing damage to the solar panel, which can occur in cold climates. The reason is that the primary liquid within the storage tank will tend to be at least as warm as the interior of the building where it is housed. The warm primary liquid in the tank will in turn heat the secondary liquid within the heat exchanger 46, causing it to rise up into the heater (solar panel) 12 to replace colder secondary liquid which has been chilled by the outside air temperature. This circulation will tend to keep the secondary liquid within the solar panel from freezing, possibly avoiding costly freezing damage. The same is true for the pump 14, into which the warm secondary liquid may also rise to prevent freezing damage. The pump 14 could be installed indoors or outdoors, provided its height in relation to the other system components is as described above.

It will be appreciated that, although system 10 is described above as heating a primary liquid (e.g. water) using a secondary liquid (e.g. ethylene glycol), it would also function to heat a gas using the secondary liquid. Accordingly, the system 10 may aptly be described as a "fluid heating system". Moreover, the fluid heating and storage tank 16 could be used to heat a primary fluid using a secondary fluid that is a gas rather than a liquid.

As will be appreciated by those skilled in the art, modifications to the above-described embodiment can be made without departing from the essence of the invention. For example, it is possible for the open container 38 to comprise a secondary heat exchanger that is integrated into the fluid heating/storage tank 16, to avoid the need for a separate container 38. The secondary heat exchanger is for holding spillover secondary fluid within the storage tank 39 in isolation from the primary fluid. This is illustrated in FIGS. 4 and 5.

Figure 4:
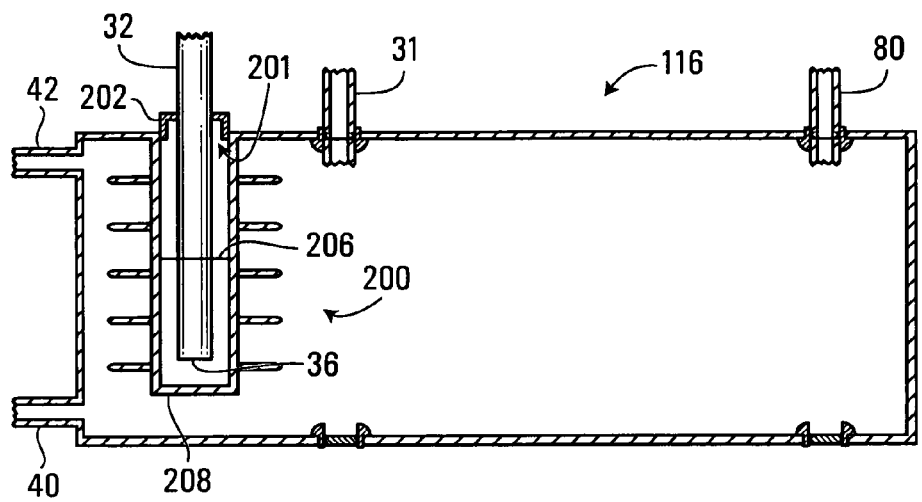
FIG. 4 is a cross section of a fluid heating and storage tank used in an alternative fluid heating system to that shown in FIG. 1.
Figure 5:
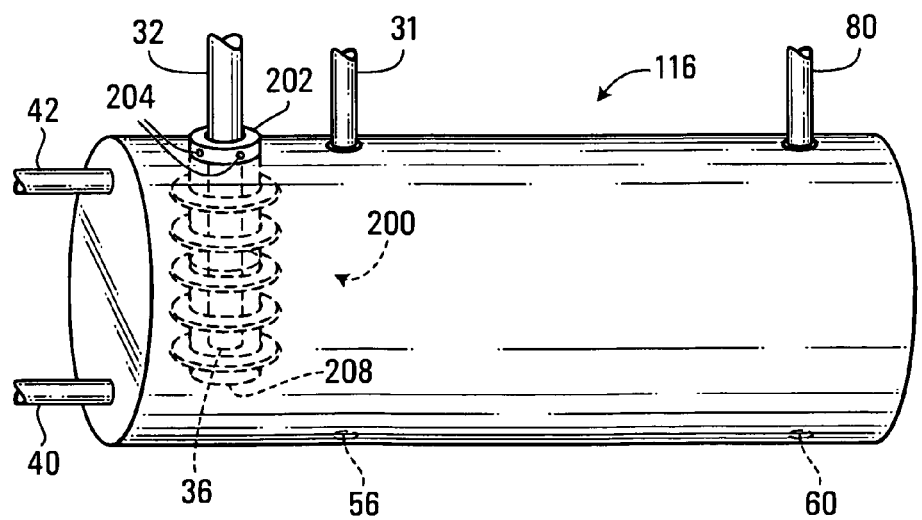
FIG. 5 is a perspective view of the storage tank of FIG. 4.

Referring to FIGS. 4 and 5, an alternative fluid heating/storage tank 116 is illustrated in cross section and perspective view, respectively. The H-shaped structure formed by pipes 48, 50 and heat exchanger 46 of FIG. 1 is omitted from both figures for clarity. In FIGS. 4 and 5, a secondary heat exchanger 200 serves a similar purpose as open container 38 of FIG. 1 but eliminates the need for a separate container. The heat exchanger 200 also serves to pass heat from any spillover secondary liquid 206 and gas that has exited the pump 14 through breathing pipe 32 during its operation to primary fluid within the tank 116. The secondary heat exchanger 200 thus supplements the role of the heat exchanger 46, which may be referred to as the "primary" heat exchanger, in heating primary fluid.

The heat exchanger 200 has an open upper end 201 (see FIG. 4) and a lower end 208 (see FIGS. 4 and 5). The open upper end 201 may be flush with top of the tank 116. The lower end 208 is situated at or near a bottom of the tank 116. The exemplary heat exchanger 200 has set of radially extending, washer-shaped fins for facilitating heat exchange to the primary fluid. The secondary heat exchanger 200 receives a secondary fluid conduit (which in this case is breathing pipe 32) below its open upper end 201. In the illustrated embodiment, the lower end 36 of breathing tube 32 is spaced slightly above the lower end 208 of the heat exchanger 200. The end 36 may become submerged in liquid during system operation, as illustrated.

Figure 8:
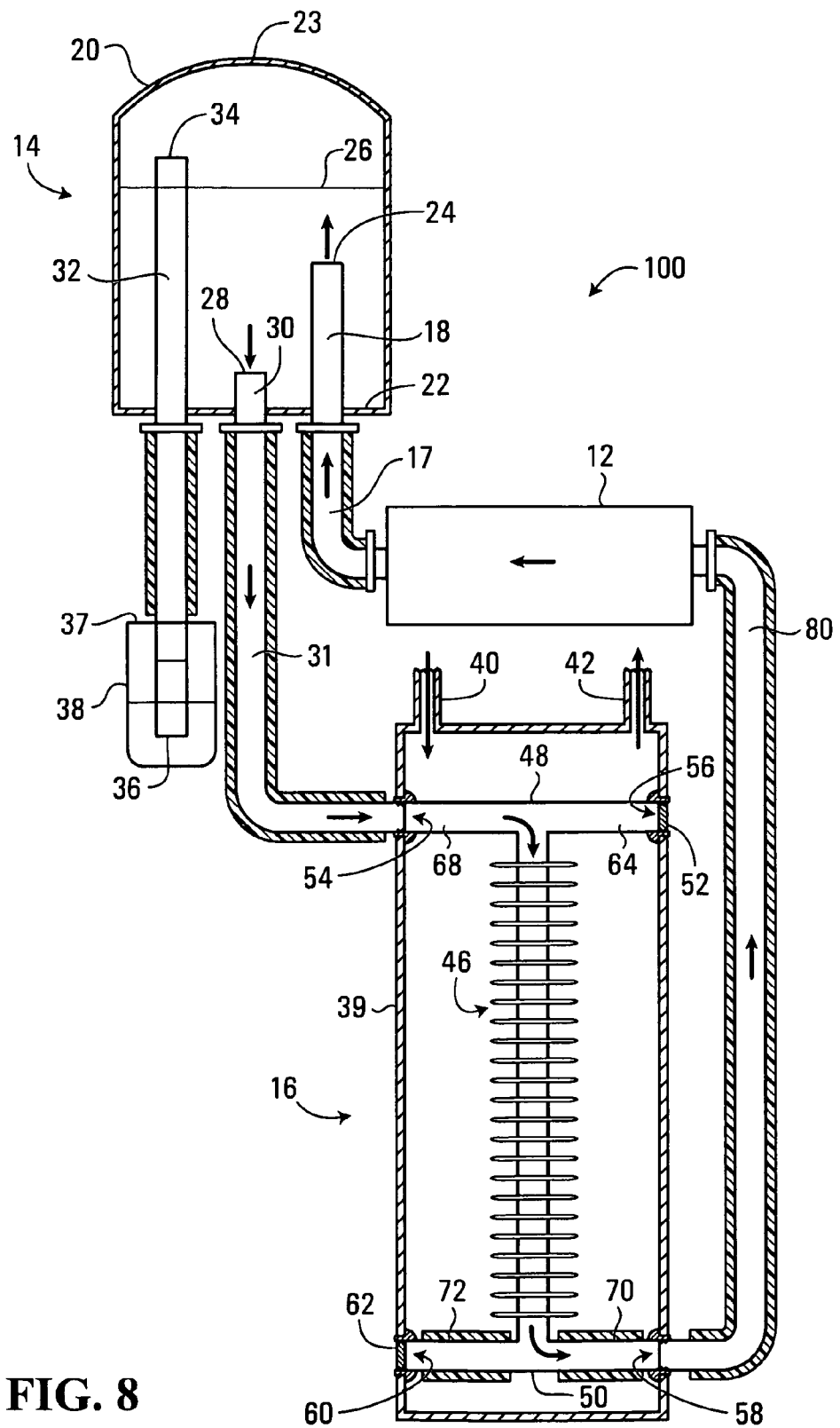
FIG. 8 is a cross section of an alternative fluid heating system embodiment.

Note that, in FIGS. 4 and 5, the relative positions of conduit 31 and breathing pipe 32 are swapped; this is to prevent the heat exchanger 200 from interfering with the H-like (or N-like) primary heat exchanger structure. A corresponding change would need to be made to the relative positions of the outlet pipe 30 and breathing pipe 32 in the pump 14 in this case, as shown in FIG. 8 for example.

To limit undesirable cooling of the secondary liquid within the heat exchanger 200, which could in turn undesirably cool the primary fluid within tank 116, a cap 202 surrounding breathing pipe 32 caps the open upper end 201 of the heat exchanger 200. The cap 202 is not an airtight cap. A set of holes 204 (FIG. 5) around the cap permits the passage of gas. This is to avoid fully closing the heat exchanger 200 off from the atmosphere. The cap may be made from an insulating material such as Styrofoam™.

In another alternative, when the fluid heating/storage tank is open to the atmosphere and the primary fluid and secondary fluid are the same liquid, the separate open container 38 can be eliminated, with the tank itself acting as the open container 38 in addition to serving as a tank (i.e. one structure serves both purposes). This is illustrated in FIGS. 6 and 7.

Figure 6:
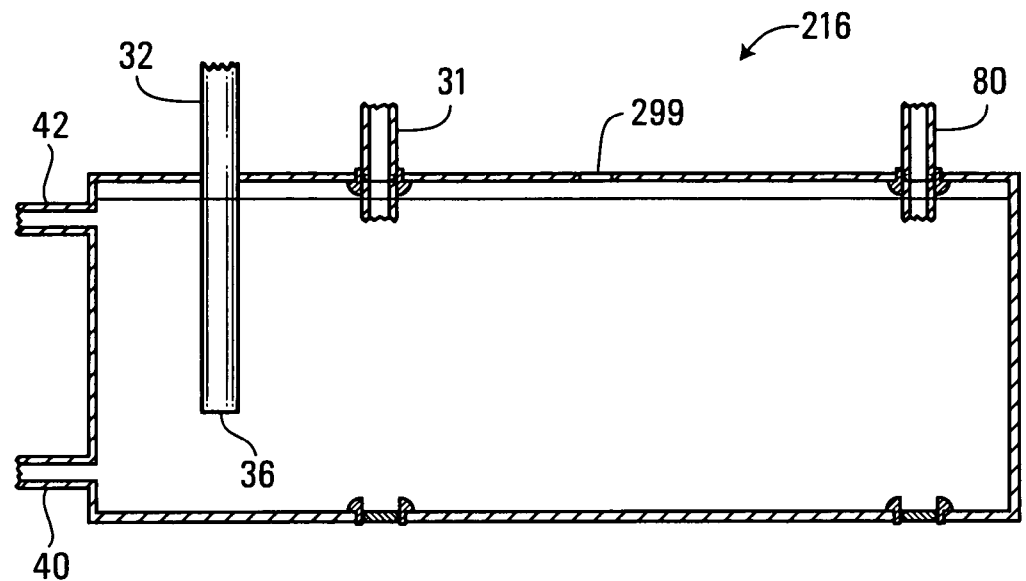
FIG. 6 is a cross section of an of a fluid heating and storage tank used in an alternative fluid heating system to that shown in FIG. 1
Figure 7:
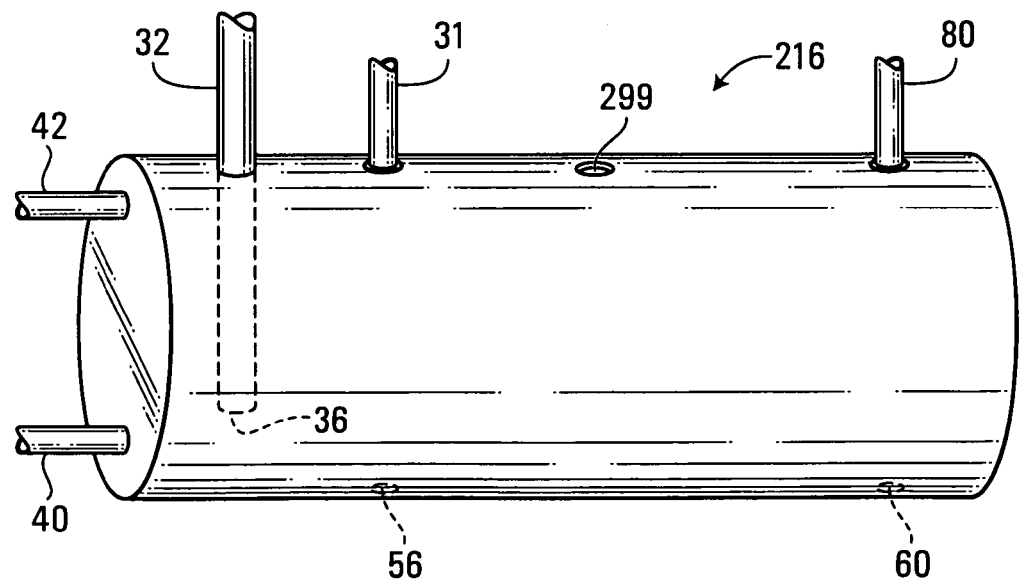
FIG. 7 is a perspective view of the storage tank of FIG. 6.

Referring to FIGS. 6 and 7, an alternative fluid heating/storage tank 216 is illustrated in cross section and perspective view respectively. The H-shaped (or N-shaped) structure including heat exchanger 46 has again been omitted for clarity. As in FIGS. 4 and 5, the relative positions of conduit 31 and breathing pipe 32 have been swapped, in this case to prevent breathing pipe 32 from interfering with the H-shaped (or N-shaped) structure. A corresponding change would need to be made to the relative positions of the outlet pipe 30 and breathing pipe 32 in the pump 14 (e.g. as in FIG. 8). The primary liquid to be heated enters the storage tank 216 of FIGS. 6 and 7 through a first pipe 40 and heated primary liquid exits the tank 216 through a second pipe 42. The tank 216 is open to the atmosphere, as represented by aperture 299. As a result, the tank 216 need not always be completely filled with the primary liquid. A secondary fluid spillover pipe, which in the illustrated embodiment is the lower portion of breathing pipe 32, extends downwardly into the storage tank 39. The open end 36 of the pipe 32 is above a bottom of said storage tank, e.g. spaced slightly above it, and is in fluid communication with an interior of the storage tank 39. This end 36 should be maintained below the level of the primary liquid within tank 216 during operation to limit evaporation of the liquid from the closed liquid loop, although the pump 14 can still function even if the level of primary liquid drops below end 36 for some period of time. Notably, because the breathing pipe 32 is in direct fluid communication with the interior of tank 216, the secondary liquid that circulates through the closed loop formed by the heater 12, pump 14 and heat exchanger 46 should be the same as the primary liquid within the tank 216, since commingling of the two liquids may occur.

In some cases, there may be insufficient room in the premises of a consumer for the fluid heating/storage tank 16 to be laid on its side as shown in FIG. 1. In such cases, the consumer may prefer to have the fluid heating/storage tank 16 in a vertical orientation. This arrangement is illustrated in FIG. 8.

Referring to FIG. 8, an exemplary liquid heating system 100 is illustrated. The system 100 is the same as the system 10 of FIG. 1 with two exceptions. First, the relative positions of the outlet pipe 30 and breathing pipe 32 in the pump 14 have been swapped as compared to FIG. 1. This simply illustrates an alternative arrangement for pump 14. Second, the fluid heating/storage tank 16 has been stood on its end in a vertical orientation. This results in a smaller footprint of the tank 16, which may be preferred by some consumers. To facilitate interconnection of the tank 16 in this orientation with the remainder of the system 100, the cap 56, which had been in fitting 54 in FIG. 1, has been moved to fitting 52 in FIG. 8, and conduit 31 has been attached to the fitting 54. The other cap 62 has been left in place in fitting 60. When the fittings are capped in this manner, it will be appreciated that the flow of heated secondary liquid through the "H shaped" structure is different than in FIG. 1, as follows: the heated secondary liquid enters leg 68 through fitting 54 (not leg 64 through fitting 52), flows through heat exchanger 46 into leg 70, and exits leg 70 via fitting 58. It will be appreciated that the flow of secondary liquid within legs 64 and 72 is limited or non-existent in this arrangement. The system 100 of in FIG. 8 thus shows how a consumer may easily configure the fluid heating/storage tank 16 to use either of fittings 52 or 54 as the secondary liquid inlet, and either of fittings 56 or 58 as the secondary liquid outlet, as is convenient or necessitated by space limitations within a consumer premises. It may be desirable to cap fittings on opposite sides of the tank 16 (i.e. fitting 54 and fitting 58, or fitting 52 and fitting 60) to limit the length of conduit necessary to interconnect the tank 116 with the other system components (i.e. heater 12 and pump 14) and to limit the number of bends or elbows in the conduits. In FIG. 8, the fluid heating/storage tank 16 is self-standing on a wall of tank 39 that is adjacent to the base upon which the tank was self-standing in FIG. 1. The adjacent wall has a smaller footprint than the base. It is not necessary for all embodiments of fluid heating/storage tank 16 to be capable of installation in multiple orientations.

It is possible for the fluid heating and storage tank 16 of FIG. 1 to be used in fluid heating systems that do not have a self-powered pump such as pump 14. Such an alternative use of the tank 16 is shown in FIG. 9.

Figure 9:
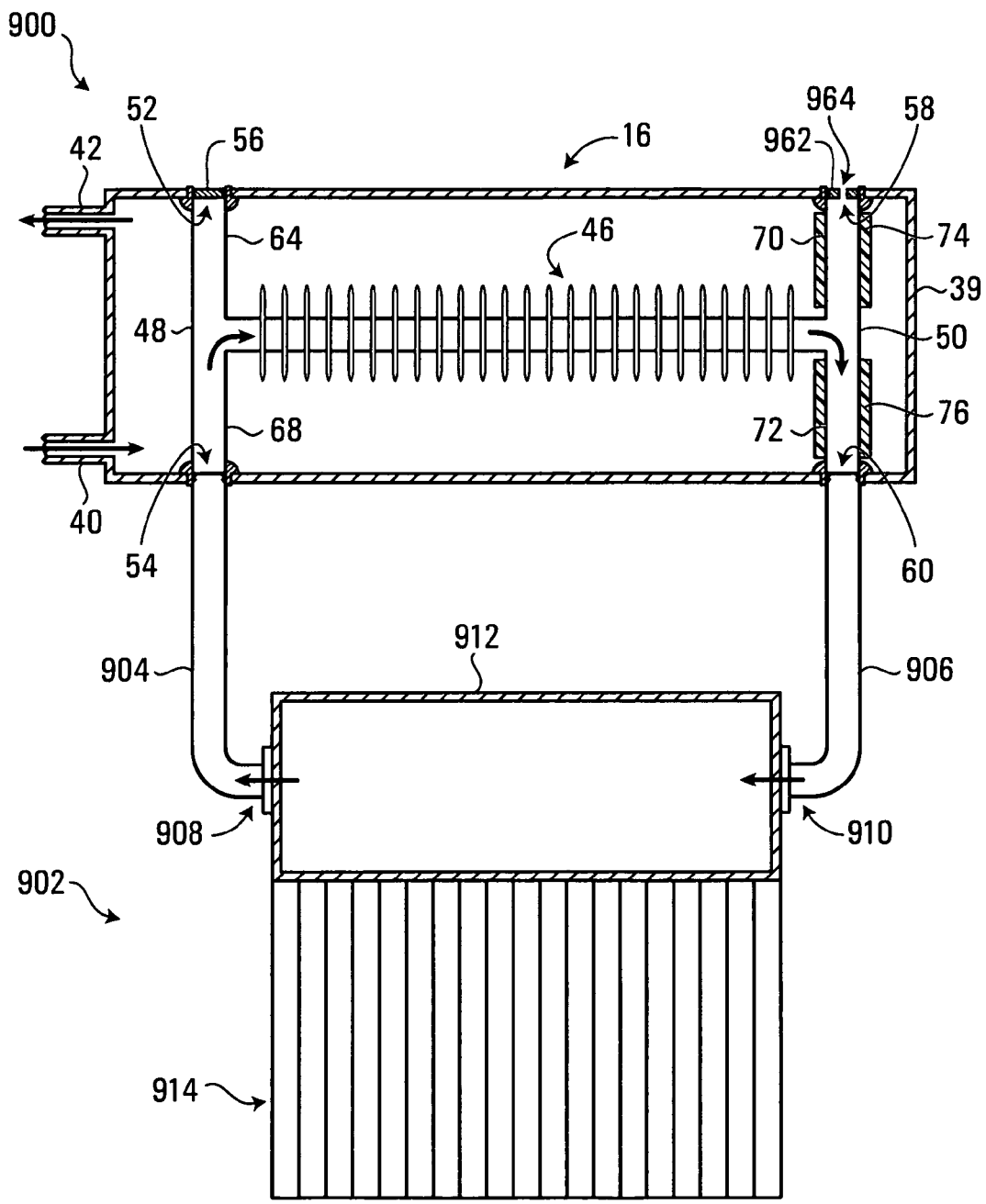
FIG. 9 is schematic side view of another exemplary fluid heating system that utilizes the fluid heating and storage tank of FIG. 1 and requires no pump.

Referring to FIG. 9, an alternative fluid heating system 900 is illustrated in schematic side view during use. The system 900 is for heating a primary fluid, such water for human consumption. The system 900 includes a solar heater 902 for heating a secondary liquid and a fluid heating and storage tank 16 above the heater 902. The tank 16 is largely as earlier described, with several exceptions. Firstly, cap 56 is used to cap fitting 52 (not fitting 54). Secondly, cap 62 is removed and a different cap 962 is used to cap fitting 58 (leaving fitting 60 uncapped). The cap 962 has a small aperture 964 which may be referred to as a "breathing hole" as it permits the egress and ingress of gas to/from the atmosphere as the secondary fluid within the heat exchanger 46 expands and contracts. The solar heater 902 and heat exchanger 46 within the tank 16 are interconnected so as to form a closed circuit through which the secondary liquid can circulate. Either or both of caps 56 and 962 may be removable (e.g. threaded) to facilitate the addition of secondary fluid to the closed circuit, e.g. initially or upon fluid evaporation.

Solar heater 902 is a conventional solar heater as may be purchased commercially. The heater 902 includes a reservoir 912 for secondary liquid. The reservoir has a secondary liquid inlet 910 and a secondary liquid outlet 908. The inlet 910 is fluidly interconnected with a conduit 906, whose other end is fluidly interconnected with fitting 60. The outlet 908 is fluidly interconnected with a conduit 904, whose other end is fluidly interconnected with fitting 54. The heater 902 also includes a solar panel 914 which collects solar energy for heating secondary liquid. The solar panel 914 may be a flat panel having a set of vertically oriented compartments or a series of vertically oriented evacuated glass tubes for example.

In operation, solar energy heats secondary liquid within panel 914. The heated secondary liquid expands and rises naturally into reservoir 912. The heated secondary liquid then exits reservoir through outlet 908 and flows upwardly through conduit 904 and into tank 16 through fitting 54. Fitting 54 serves as a secondary fluid inlet of the tank 16 in the illustrated embodiment. The secondary fluid then flows through leg 68 of pipe 48 and enters heat exchanger 46. The heat exchanger 46 passes heat from the secondary liquid to primary fluid within the tank 16. The secondary liquid then exits the heat exchanger 46 into leg 72 of pipe 50 and exits the tank 16 via fitting 60. Fitting 60 serves as a secondary fluid outlet of the tank 16 in the illustrated embodiment. From there the now-cooler secondary liquid flows downwardly through conduit 906 through inlet 910 back into reservoir 912, and down into evacuated tubes 914, where the cycle repeats anew.

Figure 10:
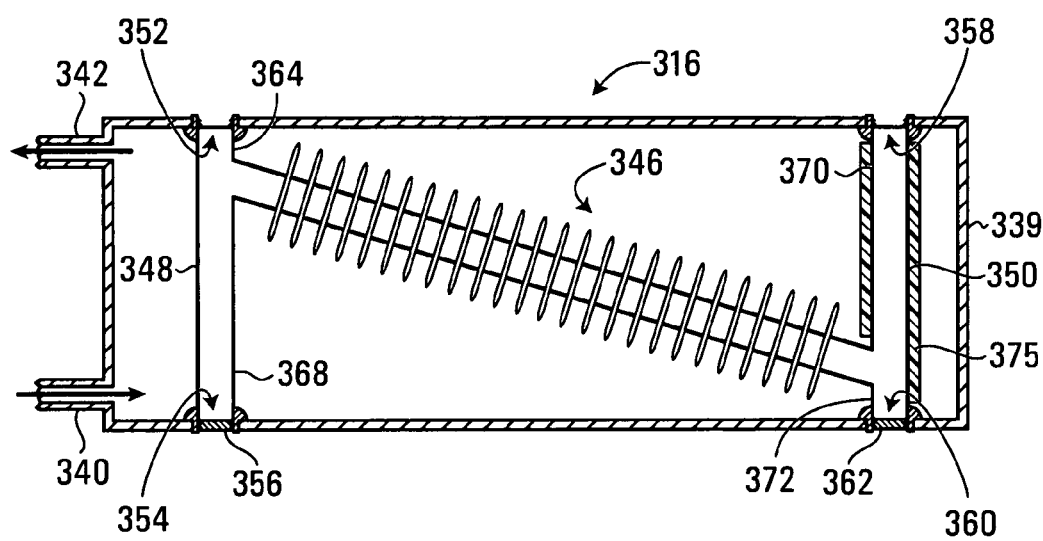
FIG. 10 illustrates a fluid heating and storage tank whose inner structure is different from that illustrated in FIG. 1.

As noted above, the heat exchanger apparatus in some embodiments of the fluid heating and storage tank 16 may have an N-like shape. Such an embodiment is illustrated in FIG. 10. Referring to that figure, fluid heating/storage tank 316 includes a storage tank 339 for a primary liquid having an inlet 340 for primary liquid to be heated and an outlet 342 for the primary liquid once it has been heated. The apparatus for flowing the secondary liquid through the tank includes a first and second pipes 348 and 350 extending through the storage tank 339 and mounted to fittings 352, 354 and 358, 360 (respectively) in a similar fashion to pipes 48 and 50 of FIG. 1. Fittings 354 and 360 are capped with caps 356 and 362, respectively, in the illustrated embodiment. A heat exchanger 346 is disposed within the tank 339 and fluidly interconnects the pipes 348 and 350. The interconnection of heat exchanger 46 with pipe 348 is closer to fitting 352 than to fitting 354, while its connection to pipe 350 is closer to fitting 360 than to fitting 358. As a result, the leg 364 of pipe 348 is shorter than leg 368, and the leg 370 of pipe 350 (which is insulated with insulation 375) is longer than leg 372. This gives the heat exchanger apparatus structure an N-like shape.

With respect to the pump 14, it is not necessarily true in all embodiments that each of the inlet pipe 18, outlet pipe 30 and breathing pipe 32 pass through the base 22 of airtight container 20. In some embodiments, one or more of these pipes may pass through a wall of the airtight container 20. In this case the pipe may be angled away from the vertical, at least at the point at which it passes through the wall of the container 20.

In some embodiments, the outlet 28 of pump 14 may be flush with the base 22 of airtight container 20 rather than extending into container 20. It is also possible that the various pipes and conduits extending downwardly from the base 22 of pump 14 may be detachable at base 22 (e.g. threaded) for convenience of assembly/disassembly and for convenient storage. The latter is illustrated in FIG. 11.

Figure 11:
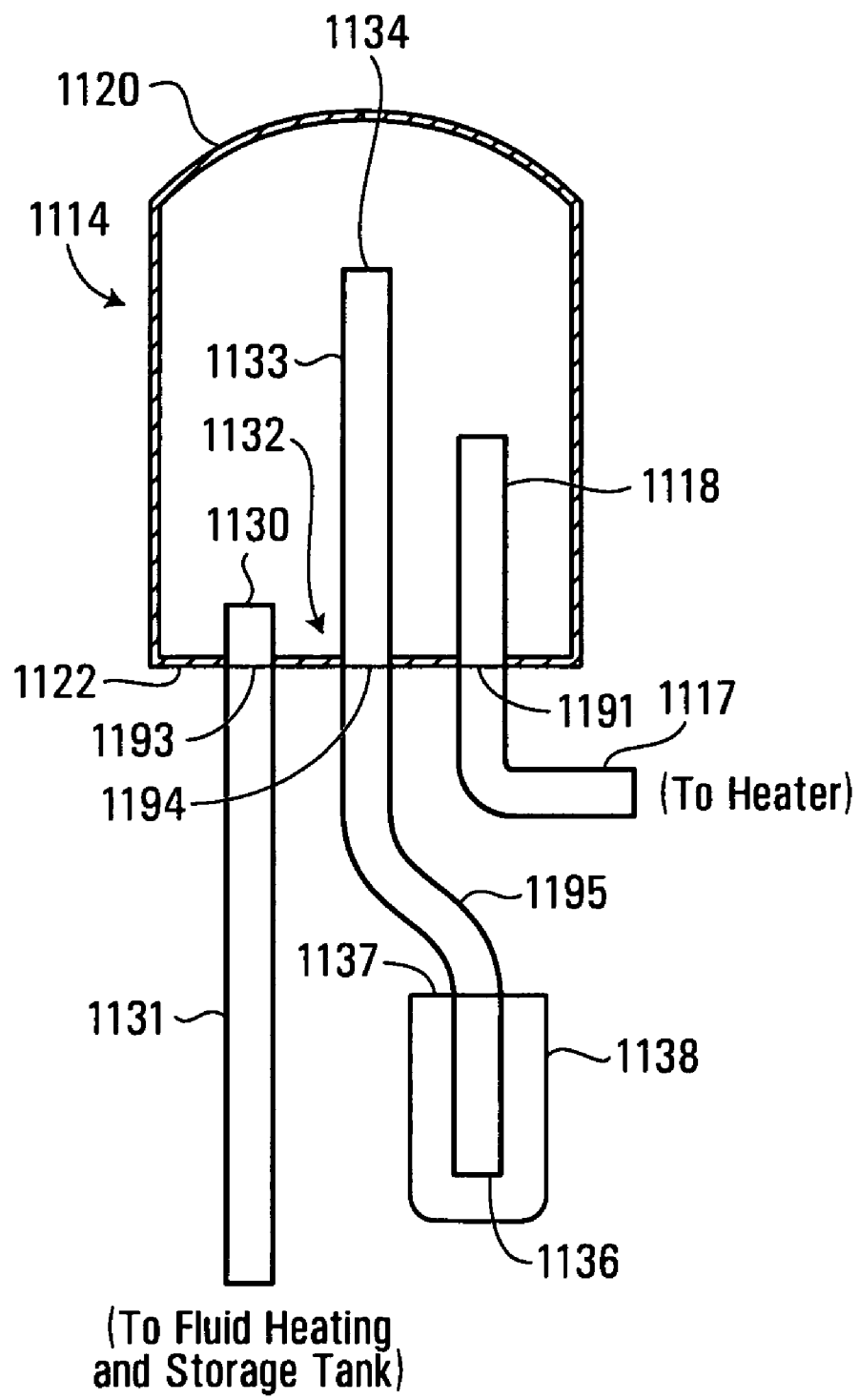
FIG. 11 is schematic diagram illustrating an alternative pump to the one shown in FIG. 1.

Referring to FIG. 11, an alternative embodiment 1114 of the pump of FIG. 1 is illustrated. As illustrated, each of inlet pipe 1118 and outlet pipe 1130 extends very little (or not at all) below base 1122 of airtight container 1120. The lower end 1191 of the inlet pipe 1118 detachably interconnects with conduit 1117 (to the heater) and the lower end 1193 of outlet pipe 1130 detachably interconnects with conduit 1131 (to the fluid heating and storage tank). The interconnections are fluid interconnections and may for example be threaded. The breathing pipe 1132 has an upper portion 1133 and a lower portion 1195. The upper portion 1133 is rigid and extends upwardly through base 1122 of container 1120 such that its upper end 1134 is within the container and below an interior of the top of the container 1120. The upper portion 1133 extends very little (or not at all) below base 1122 (e.g. its lower end 1194 is just below or flush with base 1122). The lower portion 1195 of breathing pipe 1132 is detachably fluidly interconnected with the upper portion 1133 at end 1194 and may be flexible as shown in FIG. 11. The opposite end 1136 of breathing pipe 1132 (so named because it is opposite of end 1134) is received within open container 1138, below its brim 1137, such that it may become submerged during pump operation. It will be appreciated that the lower portion 1195 of the breathing pipe 1132, as well as the breathing pipe 32 (FIG. 1), may be referred to generically as secondary fluid conduits (for spillover secondary fluid).

It should also be appreciated that the size and shape of the tank portion 39 of fluid heating/storage tank 16 may vary in different embodiments. When the storage tank 39 is elongate (e.g. cylindrical, as illustrated), the pipes 48 and 50 may be mounted transversely within the tank 39 (as illustrated) for stability, rather than, say, longitudinally. This is not required however.

The exemplary system 10 of FIG. 1 is described as a system for heating a primary liquid that is water. Of course, it will be appreciated that the same approach could be used to heat other types of primary liquid or gas, whether for human consumption or otherwise, in other liquid fluid systems.

It will be appreciated that the conduits described above may be flexible or rigid conduits.

It will also be appreciated that, although not expressly described or illustrated in the drawings, fluid heating and storage tanks that are not open to the atmosphere (e.g. tanks 16, 116 and 316 of FIGS. 1, 4 and 10) may incorporate a pressure release valve in the wall or floor of the tank. This may be used to release pressure from the tank when the pressure within the tank becomes very high, e.g. to avoid tank damage. It may also serve to release air from the tank during the initial filling of the tank with primary fluid.

It will further be appreciated that the self-powered pump described above can be used with any fluid heating and storage tank having a storage tank for a primary fluid, wherein the storage tank has a primary fluid inlet, a primary fluid outlet, a secondary fluid inlet and a secondary fluid outlet, and apparatus disposed within the storage tank for flowing a secondary fluid which is a liquid through the storage tank in isolation from the primary fluid, the apparatus fluidly interconnecting the secondary fluid inlet with the secondary fluid outlet and comprising a heat exchanger. The apparatus need not be stabilized against vibration to be operable.

It will further be appreciated that the fluid heating and storage tanks could be employed in fluid heating systems in which the pump is not a self-powered pump. For example, an electrically powered pump may replace the self-powered pump. In this case, the relative heights of the heater, pump and tank need not necessarily be as shown in FIG. 1. Also, the pump need not necessarily be situated in the same place within the closed-loop circuit of the system as the self-powered pump of FIG. 1, as long as it circulates secondary fluid from the heater outlet to the secondary fluid inlet of the fluid heating and storage tank and from the secondary fluid outlet of the fluid heating and storage tank to the heater inlet.

Other modifications will be apparent to those skilled in the art and, therefore, the invention is defined in the claims.

What is claimed is:

1. A self-powered pump for heated liquid, comprising:
    an airtight container for containing the heated liquid, said airtight container having a base and a top;
    a heated liquid inlet pipe extending upwardly into said airtight container such that a first end of said heated liquid inlet pipe is within the airtight container;
    a heated liquid outlet pipe extended out from said airtight container, wherein a second end of said heated liquid outlet pipe is within said airtight container and lower than said first end of said heated liquid inlet pipe;
    a breathing pipe extending upwardly into said airtight container such that an upper end of said breathing pipe is within the airtight container and is higher than both of said first end of said inlet pipe and said second end of said outlet pipe but lower than an interior side of said top of said airtight container, an opposite end of said breathing pipe being outside said airtight container and lower than said base; and
    an open container open to the atmosphere for receiving said opposite end of said breathing pipe wherein said breathing pipe allows bi-directional fluid flow between said airtight container and said open container when said heated liquid overflows from said airtight container to said open container.

2. The pump of claim 1 wherein said second end of said heated liquid outlet pipe is flush with said base.

3. The pump of claim 1 wherein a portion of either of said inlet pipe or breathing pipe that extends outside said airtight container is detachable.

4. The pump of claim 1 wherein a portion of said breathing pipe that extends outside said airtight container is flexible.

5. The pump of claim 1 wherein said outlet comprises an end of an outlet pipe extending upwardly into said airtight container.

6. The pump of claim 5 wherein a portion of said outlet pipe that extends outside said airtight container is detachable.

7. The pump of claim 5 wherein each of said inlet pipe, outlet pipe and breathing pipe pass through said base of said airtight container.

8. The pump of claim 1 wherein said airtight container is heat-insulated.

9. A fluid heating system comprising:
    a fluid heating and storage tank comprising:
        a storage tank for a primary fluid, said storage tank having a primary fluid inlet, a primary fluid outlet, a secondary fluid inlet and a secondary fluid outlet; and
        apparatus disposed within said storage tank for flowing a secondary fluid which is a liquid through said storage tank in isolation from said primary fluid, said apparatus fluidly interconnecting said secondary fluid inlet with said secondary fluid outlet and comprising a heat exchanger;
    a heater for the secondary fluid, said heater having an inlet and an outlet for secondary fluid, said outlet being higher than said fluid heating and storage tank;
    a return conduit for flowing secondary fluid from said secondary fluid outlet of said fluid heating and storage tank to said heater inlet;

a self-powered pump for the secondary fluid which is a liquid, said pump being above a level of said heater outlet, said pump comprising:
    an airtight container for containing the secondary fluid, said airtight container having a base and a top;
    a secondary fluid inlet pipe extending upwardly into said airtight container such that a first end of said inlet pipe is within the airtight container;
    a secondary fluid outlet pipe extended out from said airtight container, wherein a second end of said secondary outlet pipe is within said airtight container and lower than said first end of said inlet pipe;
    a breathing pipe extending upwardly into said airtight container such that an upper end of said breathing pipe is within the airtight container and is higher than said first end of said inlet pipe and said second end of said outlet but lower than said top of said airtight container, an opposite end of said breathing pipe being outside said airtight container and lower than said base; and
    an open container open to the atmosphere for receiving said opposite end of said breathing pipe wherein said breathing pipe allows bi-directional fluid flow between said airtight container and said open container when said heated liquid overflows from said airtight container to said open container;
a conduit for flowing secondary fluid upwardly from said heater outlet to said secondary fluid inlet pipe of said self-powered pump; and
a conduit for flowing secondary fluid from said self-powered pump outlet to said secondary fluid inlet of said fluid heating and storage tank.

10. The fluid heating system of claim 9 wherein said heater is a solar heater.

11. The fluid heating system of claim 9 wherein said airtight container is heat-insulated.

12. A liquid heating system comprising:
a heater for heating said liquid, said heater having an inlet for the liquid and an outlet for the liquid;
a self-powered pump for pumping the heated liquid, said pump being above a level of said heater outlet, said pump comprising:
    an airtight container for containing the heated liquid, said airtight container having a base and a top;
    a heated liquid inlet pipe extending upwardly into said airtight container such that a first end of said inlet pipe is within the airtight container;
    a heated liquid outlet pipe extended out from said airtight container, wherein a second end of the heated liquid outlet is within said airtight container and lower than said first end of said inlet pipe;
    a breathing pipe extending upwardly into said airtight container such that an upper end of said breathing pipe is within the airtight container and is higher than both of said first end of said inlet pipe and said second end of said outlet pipe but lower than said top of said airtight container, an opposite end of said breathing pipe being outside said airtight container and lower than said base; and
    an open container open to the atmosphere for receiving said opposite end of said breathing pipe, wherein said breathing pipe allows bi-directional fluid flow between said airtight container and said open container when said heated liquid overflows from said airtight container to said open container; and
a conduit for flowing heated liquid upwardly from said heater outlet to said heated liquid inlet pipe of said self-powered pump.

13. The fluid heating system of claim 12 wherein said heater is a solar heater.

14. The fluid heating system of claim 12 wherein said airtight container is heat-insulated.

15. The fluid heating system of claim 12, further comprising a fluid heating and storage tank, said fluid heating and storage tank comprises:
a tank body for a primary fluid, said tank body having a primary fluid inlet and a primary fluid outlet; and
apparatus for flowing said liquid through said tank body in isolation from said primary fluid, said apparatus comprising:
    a first pipe extending through said tank body and mounted at one end to a first fitting in the wall of said tank body and at another end to a second fitting in the wall of said tank body;
    a second pipe extending through said tank body and mounted at one end to a third fitting in the wall of said tank body and at another end to a fourth fitting in the wall of said tank body; and
    a heat exchanger disposed within said tank body and fluidly interconnecting said first pipe and said second pipe,
    wherein at least one of said first and second fittings serve as a secondary fluid inlet and at least one of said third and fourth fittings serve as a secondary fluid outlet;
a second conduit for flowing said fluid from said secondary fluid outlet of said fluid heating and storage tank to said heater inlet;
a third conduit for flowing secondary fluid from said self-powered pump outlet to said secondary fluid inlet of said fluid heating and storage tank.

\* \* \* \* \*